US012045945B2

(12) United States Patent
Fujiwara et al.

(10) Patent No.: US 12,045,945 B2
(45) Date of Patent: Jul. 23, 2024

(54) CONTROL DEVICE, CONTROL METHOD, AND RECORDING MEDIUM

(71) Applicant: HONDA MOTOR CO., LTD., Tokyo (JP)

(72) Inventors: Tatsuro Fujiwara, Tokyo (JP); Yasushi Shoda, Tokyo (JP); Jumpei Morita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 18/072,199

(22) Filed: Nov. 30, 2022

(65) Prior Publication Data

US 2023/0177790 A1 Jun. 8, 2023

(30) Foreign Application Priority Data

Dec. 3, 2021 (JP) ................................ 2021-197000

(51) Int. Cl.
*G06T 19/20* (2011.01)
*B60R 1/22* (2022.01)

(52) U.S. Cl.
CPC ................ *G06T 19/20* (2013.01); *B60R 1/22* (2022.01); *B60R 2300/303* (2013.01); *G06T 2219/2016* (2013.01)

(58) Field of Classification Search
CPC . G06T 19/20; G06T 2219/2016; G06T 15/20; B60R 1/22; B60R 2300/303; B60R 1/31; B60R 2300/105; B60R 2300/607; G06F 3/0488
See application file for complete search history.

(56) References Cited

U.S. PATENT DOCUMENTS

2010/0066833 A1 3/2010 Ohshima et al.
2016/0339959 A1* 11/2016 Lee ...................... G06V 20/588
2020/0036952 A1* 1/2020 Iwane ..................... G06T 13/80

FOREIGN PATENT DOCUMENTS

CN 108765496 A * 11/2018
JP 2002166802 A * 6/2002
JP 5112998 B2 1/2013
JP 2013-093865 A 5/2013
JP 2013093865 A * 5/2013

OTHER PUBLICATIONS

Gao, Y., Lin, C., Zhao, Y., Wang, X., Wei, S., & Huang, Q. (2017). 3-D surround view for advanced driver assistance systems. IEEE Transactions on Intelligent Transportation Systems, 19(1), 320-328.*

* cited by examiner

*Primary Examiner* — Sarah Lhymn
(74) *Attorney, Agent, or Firm* — Paratus Law Group, PLLC

(57) ABSTRACT

A control device includes circuitry configured to: generate, based on respective pieces of imaging data obtained by a plurality of imaging devices of a moving body, a three-dimensional image indicating a space including both the moving body and surroundings of the moving bod; and cause a display device to display generated the three-dimensional image. The circuitry is capable of rotation of the space in the three-dimensional image. When it is predicted that a boundary region of the respective pieces of imaging data in the three-dimensional image is present in a specific region at time of stop of the rotation, the circuitry changes the boundary region.

5 Claims, 10 Drawing Sheets

CONTROL DEVICE, CONTROL METHOD, AND RECORDING MEDIUM

CROSS-REFERENCE TO RELATED APPLICATIONS

This application is based on and claims priority under 35 USC 119 from Japanese Patent Application No. 2021-197000 filed on Dec. 3, 2021, the contents of which are incorporated herein by reference.

TECHNICAL FIELD

The present disclosure relates to a control device, a control method, and a recording medium storing a control program.

BACKGROUND

In recent years, as a specific measure against global climate change, efforts for implementing a low-carbon society or a decarbonized society have become active. Also with respect to vehicles, reduction in $CO_2$ emission is strongly required, and autonomous driving of vehicles and introduction of driving assistance that contribute to improvement in fuel efficiency are rapidly progressing.

There is a known image generation method in which a predetermined range is imaged by each of cameras mounted on the front, rear, left, and right sides of a vehicle, and a surroundings image (for example, a bird's-eye view image and a three-dimensional image) of the vehicle and the surroundings of the vehicle is generated based on a combined image of the captured images. Japanese Patent Publication No. 5112998 (hereinafter, referred to as Patent Literature 1) discloses a vehicle surroundings monitoring device that changes an imaging range of each camera in accordance with opening and closing of a side mirror of a vehicle, and changes a boundary position between captured images in a combined image of the captured images to generate a bird's-eye view image. Further, Japanese Patent Application Laid-Open Publication No. 2013-093865 (hereinafter, referred to as Patent Literature 2) discloses a vehicle surroundings monitoring device that changes a boundary line on a generated bird's-eye view image with respect to a target, whose entirety is not displayed on the generated bird's-eye view image, so that the entirety of the target is displayed.

A three-dimensional image indicating a vehicle and the surroundings of the vehicle, as an image for checking the vehicle and the surroundings of the vehicle, may be displayed as a rotatable three-dimensional image on a display device such as a display of the vehicle. When the three-dimensional image is displayed as a rotatable image, for example, the visibility of the image at the time when the rotating three-dimensional image is stopped may be required. In particular, when a three-dimensional image is generated by combining a plurality of captured images, the visibility of an image at a boundary region between the captured images of the three-dimensional image at the time when the rotation is stopped may be required.

However, Patent Literature 1 and Patent Literature 2 do not describe the visibility of an image on a display device at the time when a rotating image is stopped. Therefore, there is room for improvement in the visibility of a rotatable three-dimensional image displayed on a display device.

An object of the present disclosure is to provide a control device, a control method, and a recording medium storing a control program capable of improving visibility of a rotatable three-dimensional image displayed on a display device.

SUMMARY

The first aspect of the present disclosure relates to a control device, including circuitry configured to:

generate, based on respective pieces of imaging data obtained by a plurality of imaging devices of a moving body, a three-dimensional image indicating a space including both the moving body and surroundings of the moving bod; and cause a display device to display generated the three-dimensional image, in which the circuitry is capable of rotation of the space in the three-dimensional image, and in which when it is predicted that a boundary region of the respective pieces of imaging data in the three-dimensional image is present in a specific region at time of stop of the rotation, the circuitry changes the boundary region.

The second aspect of the present disclosure relates to a control method to be executed by a control device, the control method including:

generating, based on respective pieces of imaging data obtained by a plurality of imaging devices of a moving body, a three-dimensional image indicating a space including both the moving body and surroundings of the moving body; and displaying the three-dimensional image on a display device, in which the control device is capable of rotation of the space in the three-dimensional image, and in which the control method further comprises when it is predicted that a boundary region of the respective pieces of imaging data in the three-dimensional image is present in a specific region at time of stop of the rotation, changing the boundary region.

The third aspect of the present disclosure relates to a non-transitory computer-readable recording medium storing a control program for causing a processor of a control device to perform processing, the processing including:

generating, based on respective pieces of imaging data obtained by a plurality of imaging devices of a moving body, a three-dimensional image indicating a space including both the moving body and surroundings of the moving body;

displaying the three-dimensional image on a display device, in which the processor is capable of rotation of the space in the three-dimensional image, and in which the processing further comprises when it is predicted that a boundary region of the respective pieces of imaging data in the three-dimensional image is present in a specific region at time of stop of the rotation, changing the boundary region.

According to the control device, the control method, and the control program of the present disclosure, it is possible to improve the visibility of a rotatable three-dimensional image displayed on a display device.

DESCRIPTION OF EMBODIMENTS

Figure 1:
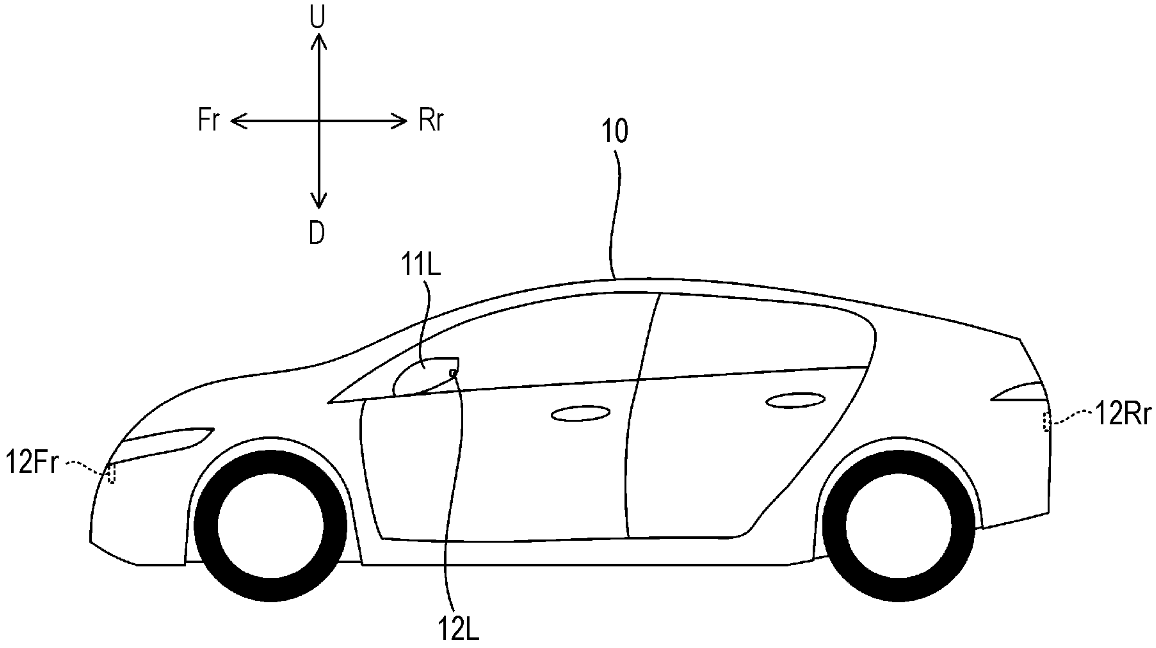
FIG. 1 is a side view illustrating an example of a vehicle on which a control device of the present embodiment is mounted.

Hereinafter, an embodiment of a control device of the present disclosure will be described with reference to the accompanying drawings. Note that the drawings are to be viewed according to orientation of the reference signs. In the present specification and the like, in order to simplify and clarify the description, a front-rear direction, a left-right direction, and an up-down direction are described in accordance with directions viewed from a driver of a vehicle 10 illustrated in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U. and a lower side thereof is denoted by D.

<Vehicle 10 on which Control Device of Present Disclosure is Mounted>

Figure 2:
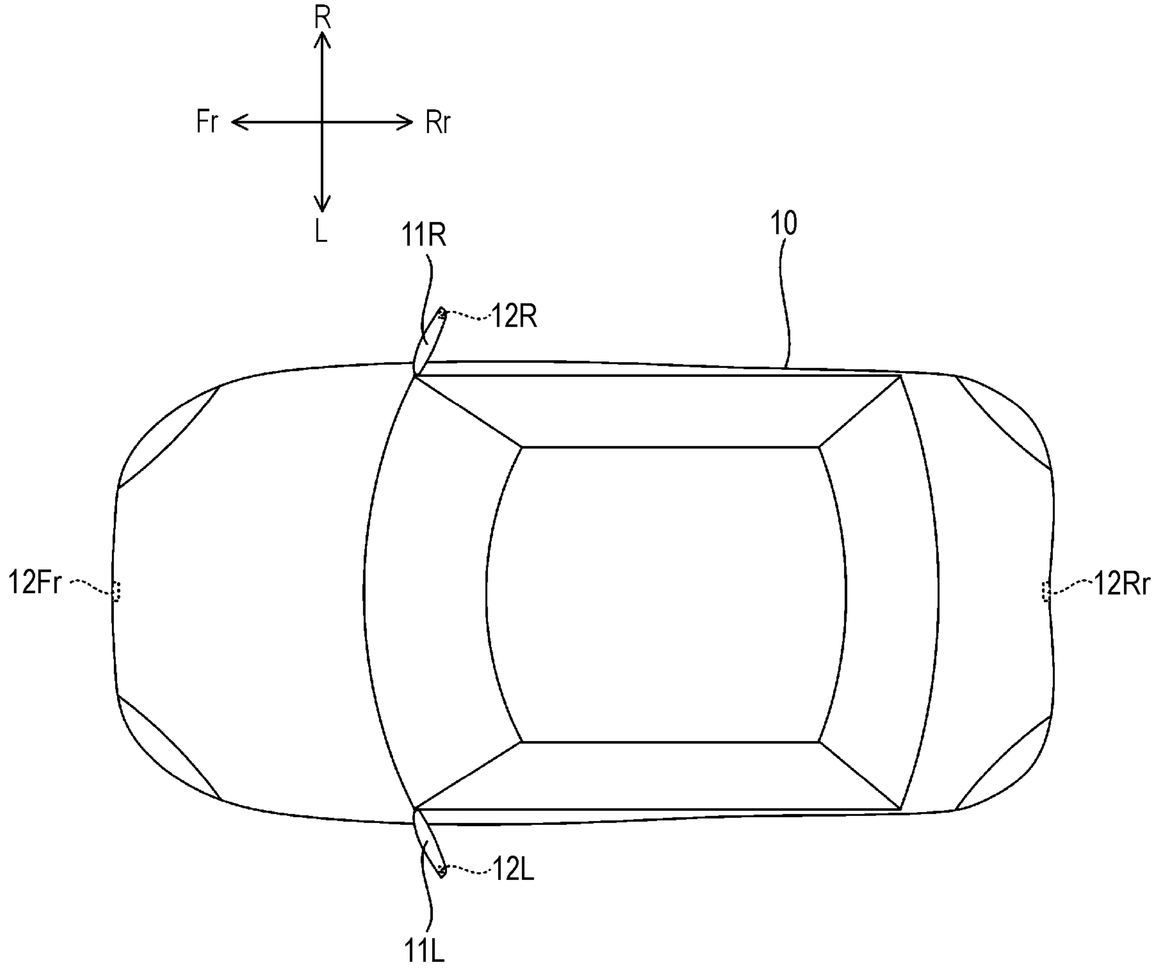
FIG. 2 is a top view of the vehicle illustrated in FIG. 1.

FIG. 1 is a side view of the vehicle 10 on which a control device according to the present disclosure is mounted. FIG. 2 is a top view of the vehicle 10 illustrated in FIG. 1. The vehicle 10 is an example of a moving body of the present disclosure.

The vehicle 10 is an automobile that includes a driving source (not illustrated) and wheels. The wheels include drive wheels driven by power of the driving source and steerable steering wheels. In the present embodiment, the vehicle 10 is a four-wheeled automobile having a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of an electric motor and an internal combustion engine. The driving source of the vehicle 10 may drive the pair of left and right front wheels, the pair of left and right rear wheels, or four wheels of the pair of left and right front wheels and the pair of left and right rear wheels. Both the front wheels and the rear wheels may be steerable steering wheels, or the front wheels or the rear wheels may be steerable steering wheels.

The vehicle 10 further includes side mirrors 11L and 11R. The side mirrors 11L and 11R are mirrors (rearview mirrors) that are provided at outer sides of front seat doors of the vehicle 10 and that allow a driver to check the rear side and rear lateral sides. Each of the side mirrors 11L and 11R is fixed to a body of the vehicle 10 by a rotation shaft extending in the up-down direction, and can be opened and closed by rotating about the rotation shaft. The side mirrors 11L and 11R are electrically opened and closed by an operation of an operation part provided in the vicinity of a driver's seat. A width of the vehicle 10 in a state where the side mirrors 11L and 11R are closed is smaller than a width thereof in a state where the side mirrors 11L and 11R are opened. Therefore, for example, when the vehicle enters a narrow parking space, the side mirrors 11L and 11R are often brought into the closed state so as not to collide with an obstacle in the surroundings.

The vehicle 10 further includes a front camera 12Fr, a rear camera 12Rr, a left lateral-side camera 12L, and a right lateral-side camera 12R. The front camera 12Fr is a digital camera that is provided in a front portion of the vehicle 10 and images a front side of the vehicle 10. The rear camera 12Rr is a digital camera that is provided in a rear portion of the vehicle 10 and images a rear side of the vehicle 10. The left lateral-side camera 12L is a digital camera that is provided in the left side mirror 11L of the vehicle 10 and images a left lateral side of the vehicle 10. The right lateral-side camera 12R is a digital camera that is provided in the right side mirror 11R of the vehicle 10 and images a right lateral side of the vehicle 10. The front camera 12Fr, the rear camera 12Rr, the left lateral-side camera 12L, and the right lateral-side camera 12R are examples of an imaging device of the present disclosure.

<Internal Configuration of Vehicle 10>

Figure 3:
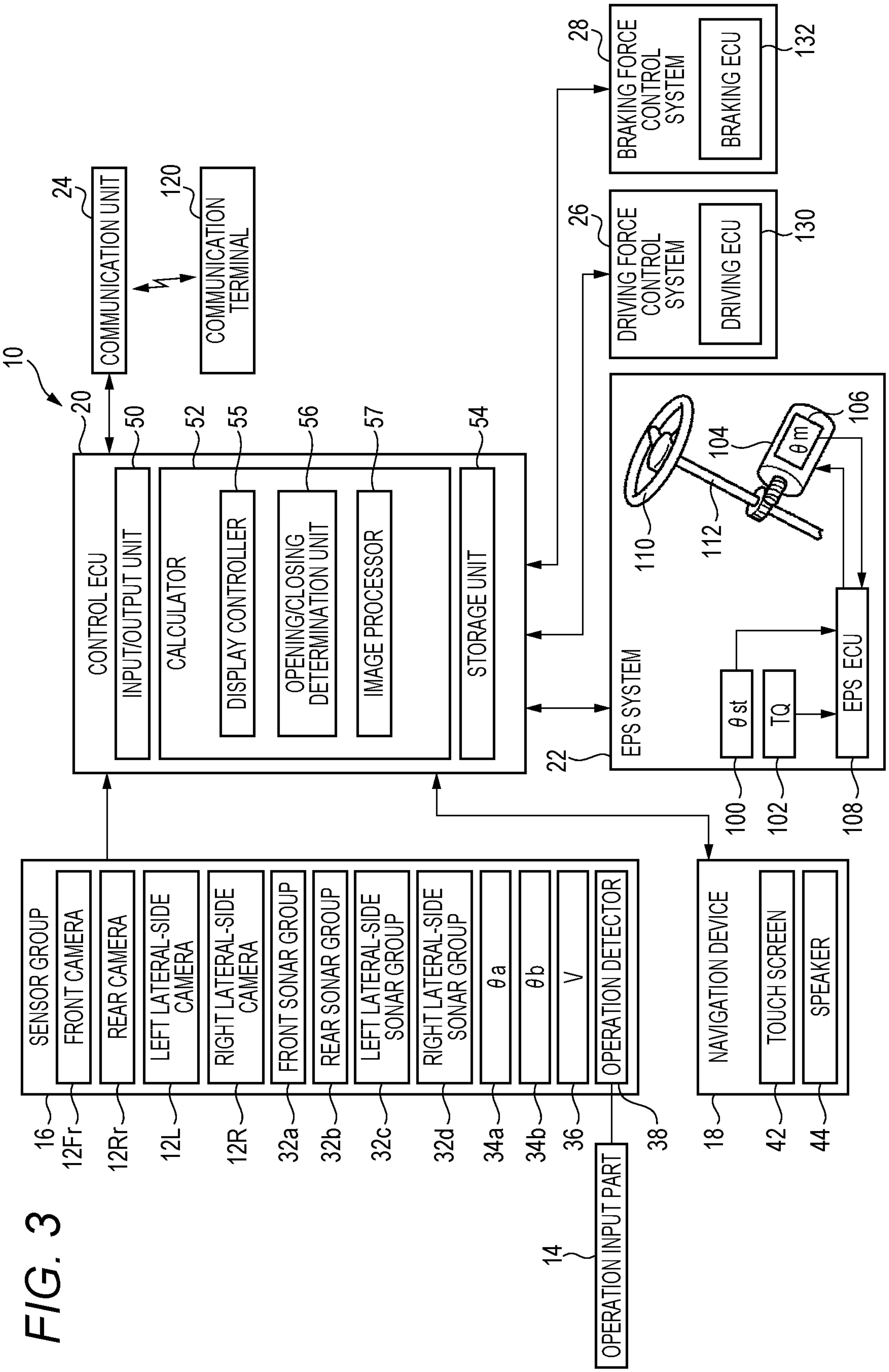
FIG. 3 is a block diagram illustrating an internal configuration of the vehicle illustrated in FIG. 1.

FIG. 3 is a block diagram illustrating an example of an internal configuration of the vehicle 10 illustrated in FIG. 1. As illustrated in FIG. 3, the vehicle 10 includes a sensor group 16, a navigation device 18, a control electronic controller (ECU) 20, an electric power steering (EPS) system 22, and a communication unit 24. The vehicle 10 further includes a driving force control system 26 and a braking force control system 28. The control ECU 20 is an example of a control device of the present disclosure.

The sensor group 16 obtains various types of detection values used for control performed by the control ECU 20. The sensor group 16 includes the front camera 12Fr, the rear camera 12Rr, the left lateral-side camera 12L, and the right lateral-side camera 12R. In addition, the sensor group 16 includes a front sonar group 32*a*, a rear sonar group 32*b*, a left lateral-side sonar group 32*c*, and a right lateral-side sonar group 32*d*. Further, the sensor group 16 includes wheel sensors 34*a* and 34*b*, a vehicle speed sensor 36, and an operation detector 38.

The front camera 12Fr, the rear camera 12Rr, the left lateral-side camera 12L, and the right lateral-side camera 12R output surroundings images obtained by imaging the surroundings of the vehicle 10. The surroundings images captured by the front camera 12Fr, the rear camera 12Rr, the left lateral-side camera 12L, and the right lateral-side camera 12R are referred to as a front image, a rear image, a left lateral-side image, and a right lateral-side image, respectively. An image formed by the left lateral-side image and the right lateral-side image is also referred to as a lateral-side image.

The front sonar group 32*a*, the rear sonar group 32*b*, the left lateral-side sonar group 32*c*, and the right lateral-side sonar group 32*d* emit sound waves to the surroundings of the vehicle 10 and receive reflected sounds from other objects. The front sonar group 32*a* includes, for example, four sonars. The sonars constituting the front sonar group 32*a* are provided at an obliquely left front side, a front left side, a front right side, and an obliquely right front side of the vehicle 10, respectively. The rear sonar group 32*b* includes, for example, four sonars. The sonars constituting the rear sonar group 32*b* are provided at an obliquely left rear side, a rear left side, a rear right side, and an obliquely right rear side of the vehicle 10, respectively. The left lateral-side sonar group 32*c* includes, for example, two sonars. The sonars constituting the left lateral-side sonar group 32*c* are provided at a front side and a rear side of a left side portion of the vehicle 10, respectively. The right lateral-side sonar group 32*d* includes, for example, two sonars. The sonars constituting the right lateral-side sonar group 32*d* are provided at a front side and a rear side of a right side portion of the vehicle 10, respectively.

The wheel sensors 34*a* and 34*b* detect a rotation angle of a wheel of the vehicle 10. The wheel sensors 34*a* and 34*b* may be implemented by an angle sensor or a displacement sensor. The wheel sensors 34*a* and 34*b* output a detection pulse each time the wheel rotates by a predetermined angle. The detection pulse output from the wheel sensors 34*a* and 34*b* is used to calculate the rotation angle of the wheel and a rotation speed of the wheel. A movement distance of the vehicle 10 is calculated based on the rotation angle of the wheel. The wheel sensor 34*a* detects, for example, a rotation angle θa of a left rear wheel. The wheel sensor 34*b* detects, for example, a rotation angle θb of a right rear wheel.

The vehicle speed sensor 36 detects a speed of a vehicle body of the vehicle 10, that is, a vehicle speed V. and outputs the detected vehicle speed V to the control ECU 20. The vehicle speed sensor 36 detects the vehicle speed V based on, for example, rotation of a countershaft of the transmission.

The operation detector 38 detects what operation is performed by a user using an operation input part 14, and outputs the detected operation that is performed to the control ECU 20. The operation input part 14 includes various user interfaces such as a side mirror switch for switching between an opened state and a closed state of the side mirrors 11L and 11R and a shift lever (a select lever or a selector).

The navigation device 18 detects a current position of the vehicle 10 using, for example, a global positioning system (GPS), and guides the user to a route to a destination. The navigation device 18 includes a storage device (not illustrated) provided with a map information database.

The navigation device 18 includes a touch screen 42 and a speaker 44. The touch screen 42 functions as an input device and a display device of the control ECU 20. The user can input various commands via the touch screen 42. The touch screen 42 displays various screens. Components other than the touch screen 42, for example, a smartphone may be used as the input device or the display device. The speaker 44 outputs various types of guidance information to an occupant of the vehicle 10 by voice.

The control ECU 20 includes an input/output unit 50, a calculator 52, and a storage unit 54. The calculator 52 is implemented by, for example, a central processing unit (CPU). The calculator 52 performs various types of control by controlling units based on a program stored in the storage unit 54.

The calculator 52 includes a display controller 55, a prediction unit 56, and an image processor 57.

Figure 6:
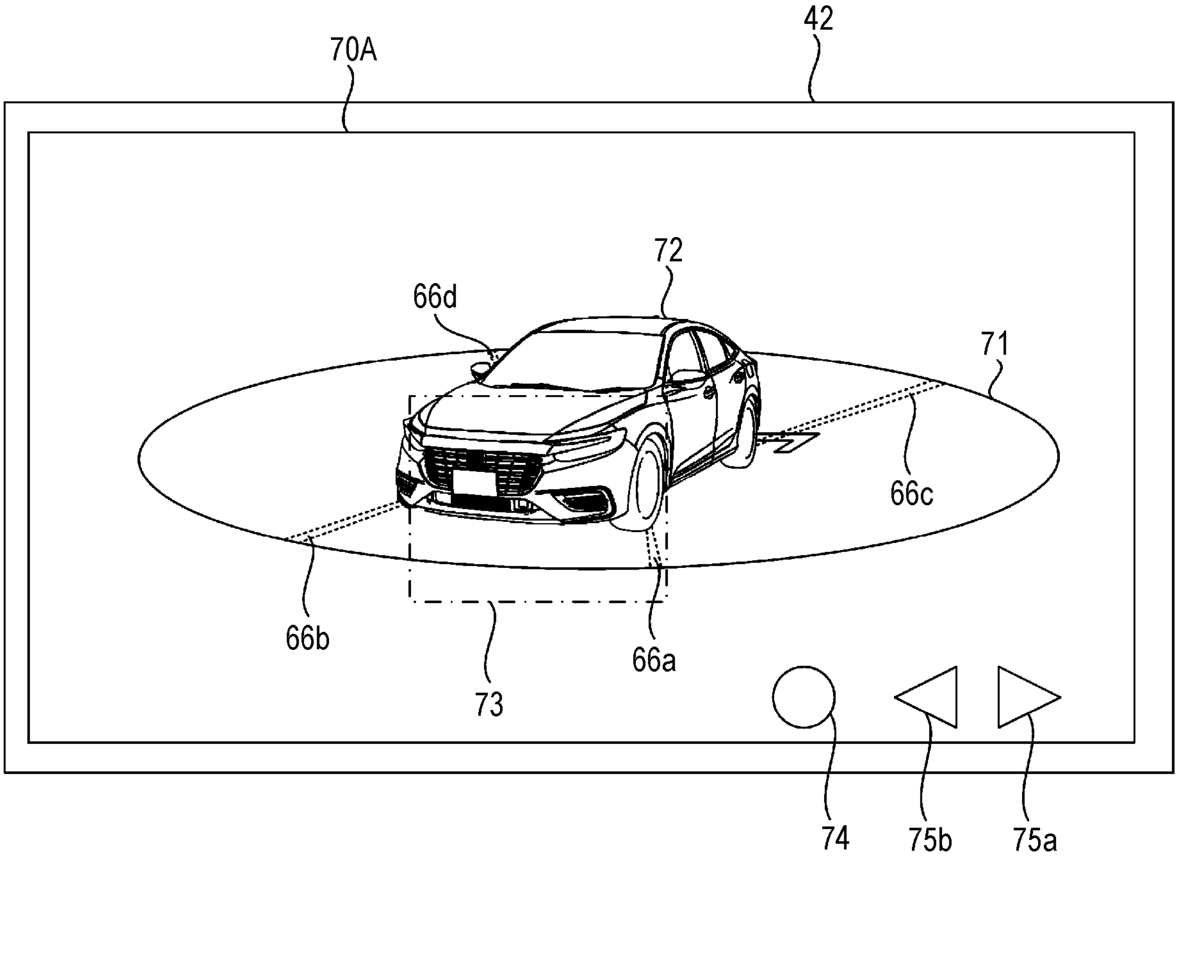
FIG. 6 is a diagram illustrating an example of an outer viewpoint three-dimensional image in which a boundary region is present in a specific region.
Figure 7:
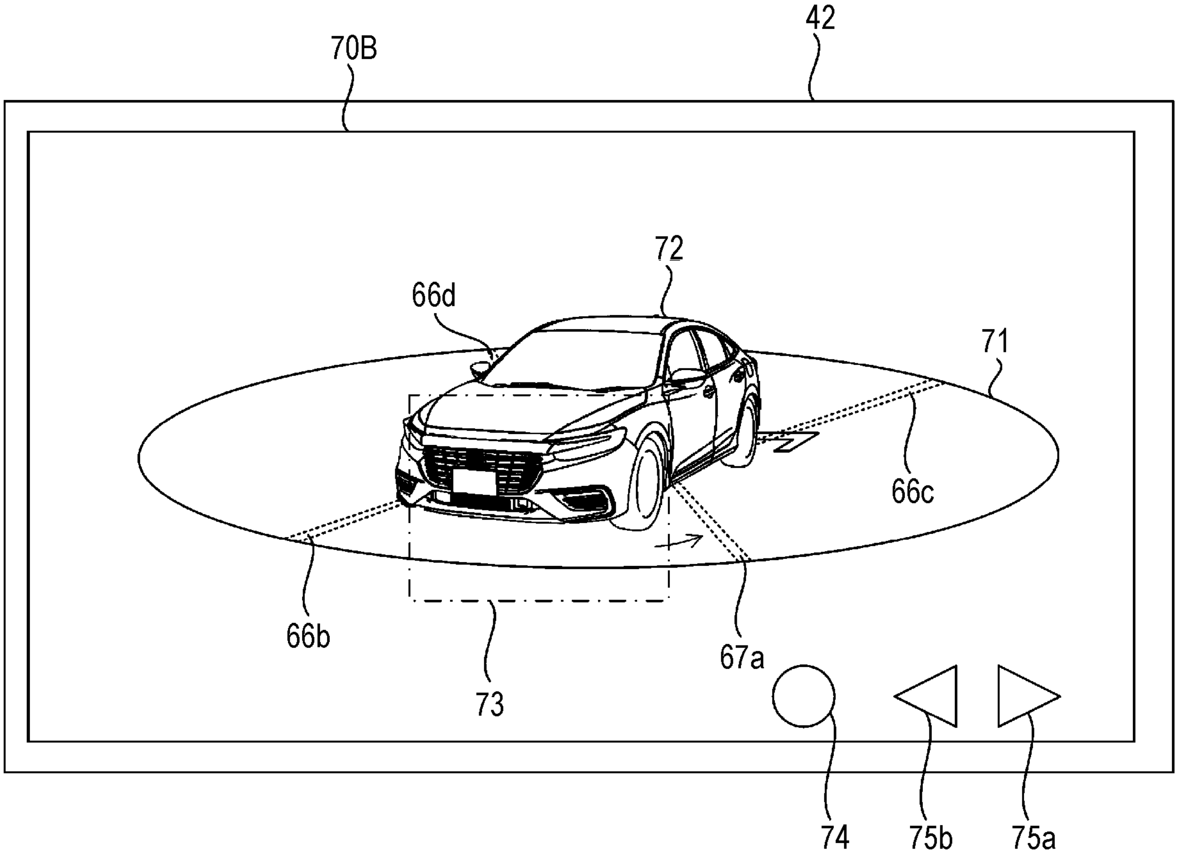
FIG. 7 is a diagram illustrating an example of an outer viewpoint three-dimensional image in which boundary regions are changed so that the boundary region illustrated in FIG. 6 is not present in the specific region.
Figure 9:
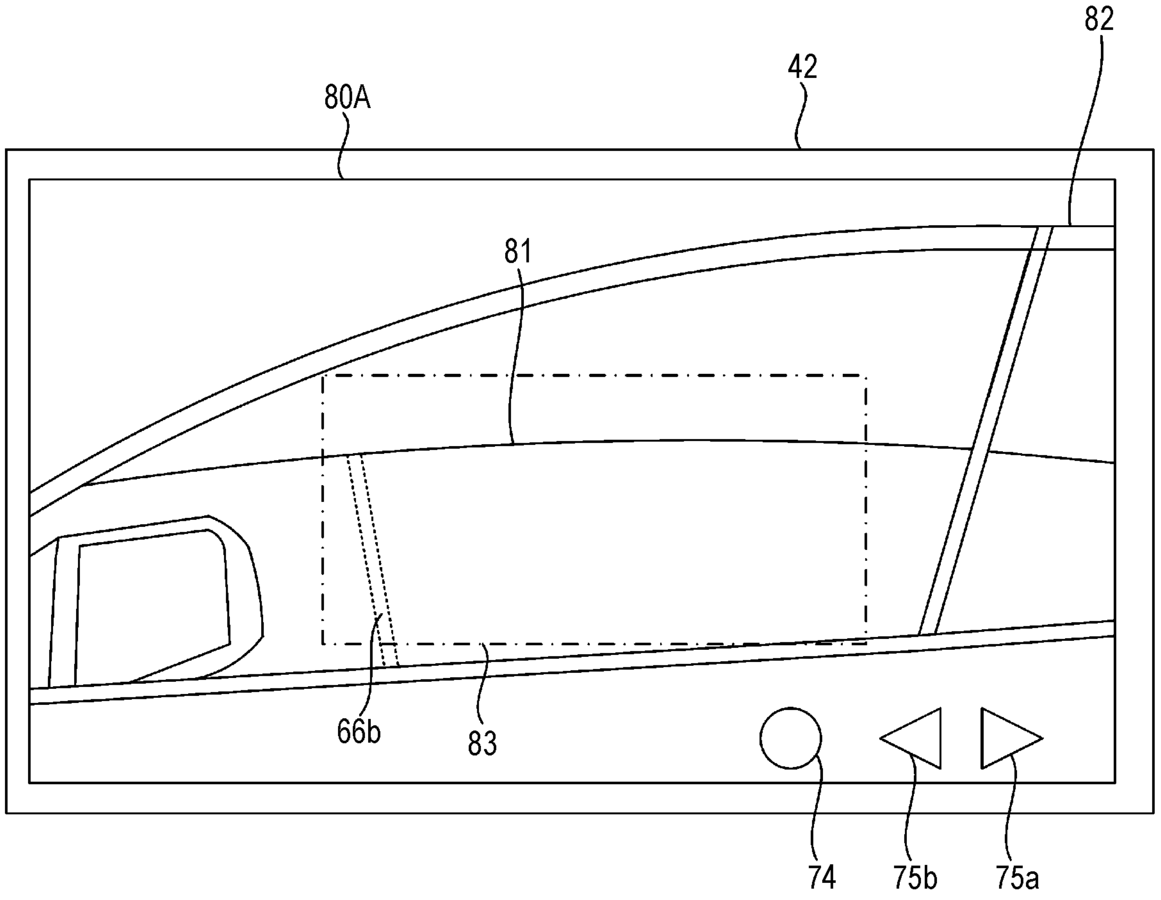
FIG. 9 is a diagram illustrating an example of an inner viewpoint three-dimensional image in which a boundary region is present in a specific region.
Figure 10:
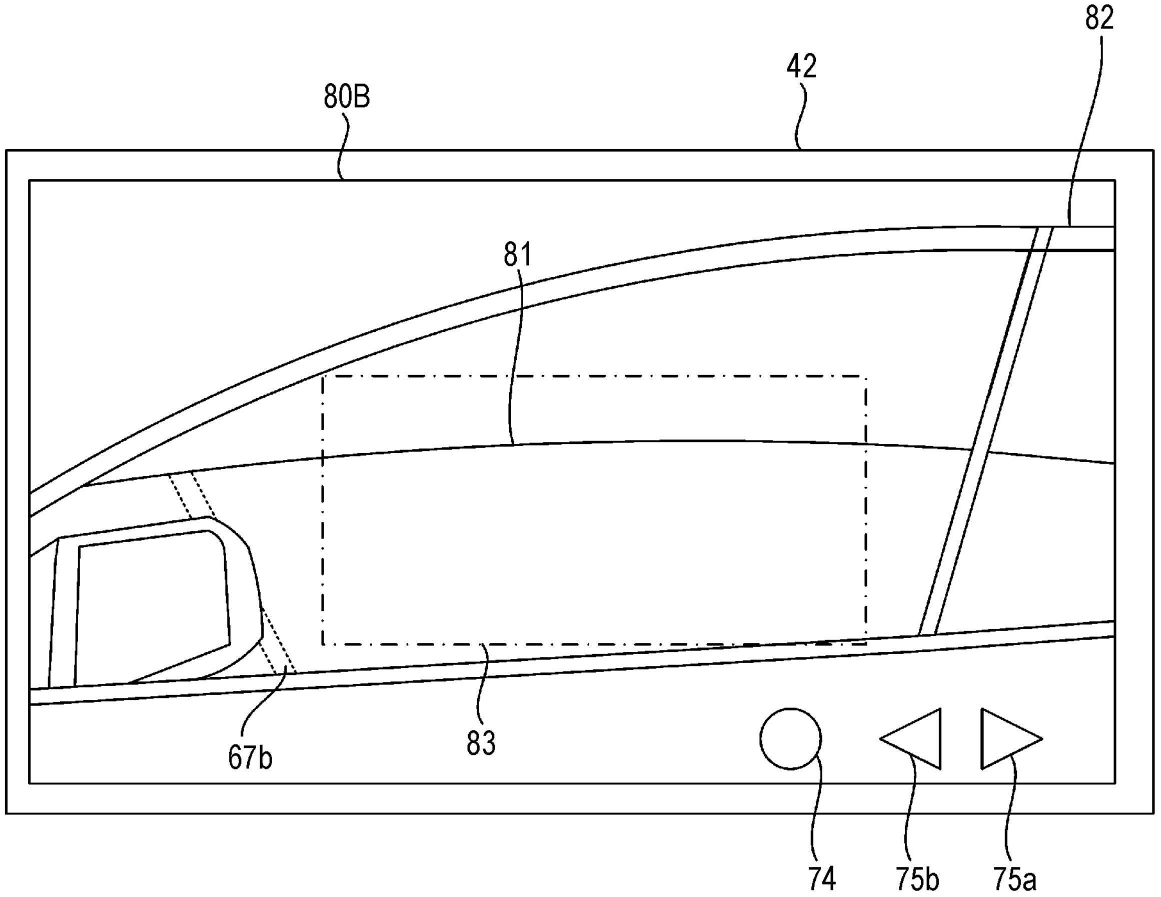
FIG. 10 is a diagram illustrating an example of an inner viewpoint three-dimensional image in which boundary regions are changed so that the boundary region illustrated in FIG. 9 is not present in the specific region.

The image processor 57 generates a surroundings image of the vehicle 10 based on imaging data obtained by the cameras of the vehicle 10. Specifically, the image processor 57 generates a synthesized image by synthesizing respective pieces of imaging data obtained by the front camera 12Fr, the rear camera 12Rr, the left lateral-side camera 12L, and the right lateral-side camera 12R, and performs image processing of three-dimensionally reconstructing the synthesized image to generate a three-dimensional image virtually indicating a space including both the vehicle 10 and the surroundings of the vehicle 10. The space in the three-dimensional image includes an outer viewpoint three-dimensional image (for example, images as illustrated in FIGS. 6 and 7) indicating a space of the three-dimensional image viewed from an outer side of the vehicle 10, and an inner viewpoint three-dimensional image (for example, images as illustrated in FIGS. 9 and 10) indicating a space of the three-dimensional image viewed from an inner side of the vehicle 10. The outer viewpoint three-dimensional image is an example of a first image of the present disclosure, and the inner viewpoint three-dimensional image is an example of a second image of the present disclosure.

The image processor 57 generates a synthesized image by synthesizing respective pieces of imaging data obtained by the front camera 12Fr, the rear camera 12Rr, the left lateral-side camera 12L, and the right lateral-side camera 12R, and based on the synthesized image, generates a bird's-eye view image of the vehicle 10 and the surroundings of the vehicle 10 as viewed from above.

In addition, the image processor 57 sets a mask area in the generated surroundings image (the bird's-eye view image and the three-dimensional image). The mask area refers to an area set to hide the body of the vehicle 10 reflected in a captured image of a camera. The mask area is set as an area having a shape surrounding the vehicle 10. The image processor 57 displays a vehicle image, which indicates the vehicle 10, in a superimposed manner in a portion corresponding to a space in which the vehicle 10 is located in the mask area. The vehicle image is a two-dimensional or three-dimensional image showing a state where the vehicle 10 is viewed from above, and is generated (captured) in advance and stored in the storage unit 54 or the like. The image processor 57 may set a mask area in the lateral-side image (the left lateral-side image and the right lateral-side image) obtained by the left lateral-side camera 12L and the right lateral-side camera 12R.

The image processor 57 enables rotation of a space in a generated three-dimensional image. For example, the image processor 57 enables manual rotation in which the space in the three-dimensional image is manually rotated and automatic rotation in which the space in the three-dimensional image is automatically rotated. In the present embodiment, the manual rotation refers to rotation that is started based on a predetermined operation performed by the user, and that continues only during a period in which the predetermined operation is continued. The automatic rotation refers to rotation that is started based on a predetermined operation performed by the user, and that continues regardless of whether or not the predetermined operation is continued.

For example, in the manual rotation, a right rotation button and a left rotation button for rotating a three-dimensional image are provided on the touch screen 42, and when the right rotation button is pressed, the space in the three-dimensional image is rotated to the right only during a period in which the right rotation button is being pressed, and when the left rotation button is pressed, the space in the three-dimensional image is rotated to the left only during a period in which the left rotation button is being pressed. In addition, in a case where the space in the three-dimensional image can be rotated by performing swiping on the touch screen 42, the rotation of the space in the three-dimensional image by swiping is included in the manual rotation. Further, inertial rotation, in which the space in the three-dimensional image rotates slightly further before stopping due to inertia of the swiping, is also included in the manual rotation.

On the other hand, for example, in a case where a rotation button for rotating the three-dimensional image is provided on the touch screen 42, and the space in the three-dimensional image is rotated for a predetermined period of time (for example, 5 seconds) set in advance based on one press of the rotation button, the rotation based on the press is included in the automatic rotation. In a case where a demonstration three-dimensional image is rotatably displayed on the touch screen 42 for only a predetermined period of time, at the time of an on-state of the ignition switch, at the time of idling, or the like, the rotation is included in the automatic rotation.

In a case where it is predicted, for a space in a three-dimensional image whose rotation is started by the manual rotation or the automatic rotation, that a boundary region of the respective pieces of imaging data in the three-dimensional image is present in a specific region set in advance when the rotation of the space in the three-dimensional image stops (namely, when the rotation of the space in the three-dimensional image is stopping or after the rotation of the space in the three-dimensional image had been stopped), the image processor 57 changes the boundary region of the respective pieces of imaging data so that the boundary region at the time of the stop is not present in the specific region. The specific region is a substantially central region of the three-dimensional image displayed on the touch screen 42, and means a region that is relatively conspicuous for the user.

Before stop of the rotation of the space in the three-dimensional image, the prediction unit 56 predicts whether the boundary region in the three-dimensional image is present in the specific region when the rotation stops.

The display controller 55 causes the display device of the vehicle 10 to display the surroundings image generated by the image processor 57. Specifically, the display controller 55 causes the touch screen 42 to display the three-dimensional image and the bird's-eye view image of the vehicle 10 generated by synthesizing the respective pieces of imaging data of the front camera 12Fr, the rear camera 12Rr, the left lateral-side camera 12L, and the right lateral-side camera 12R. In addition, the display controller 55 causes the touch screen 42 to display rotation operation buttons for causing the image processor 57 to execute rotation processing of the three-dimensional image, for example, an automatic rotation button for automatic rotation and a manual rotation button for manual rotation.

Further, the control ECU 20 may perform parking assistance of the vehicle 10 by automatic steering in which the operation of the steering wheel 110 is automatically performed under the control of the control ECU 20. In the assistance of automatic steering, an accelerator pedal (not illustrated), a brake pedal (not illustrated), and the operation input part 14 are automatically operated. In addition, when the user operates the accelerator pedal, the brake pedal, and the operation input part 14 to park the vehicle 10, the control ECU 20 may perform auxiliary assistance.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects a torque TQ applied to the steering wheel 110.

The EPS motor 104 applies a driving force or a reaction force to a steering column 112 coupled to the steering wheel 110, thereby enabling operation assistance of the steering wheel 110 and automatic steering at the time of parking assistance for the occupant. The resolver 106 detects a rotation angle θm of the EPS motor 104. The EPS ECU 108 controls the entire EPS system 22. The EPS ECU 108 includes an input/output unit (not illustrated), a calculator (not illustrated), and a storage unit (not illustrated).

The communication unit 24 enables wireless communication with another communication device 120. The other communication device 120 is a base station, a communication device of another vehicle, an information terminal such as a smartphone possessed by an occupant of the vehicle 10, or the like.

The driving force control system 26 is provided with a driving ECU 130. The driving force control system 26 executes driving force control of the vehicle 10. The driving ECU 130 controls an engine or the like (not illustrated) based on an operation that the user performs on the accelerator pedal (not illustrated), thereby controlling a driving force of the vehicle 10.

The braking force control system 28 is provided with a braking ECU 132. The braking force control system 28 executes braking force control of the vehicle 10. The braking ECU 132 controls a braking force of the vehicle 10 by controlling a brake mechanism or the like (not illustrated) based on an operation that the user performs on the brake pedal (not illustrated), thereby controlling a braking force of the vehicle 10.

<Change of Boundary Region by Image Processor 57>

Figure 4:
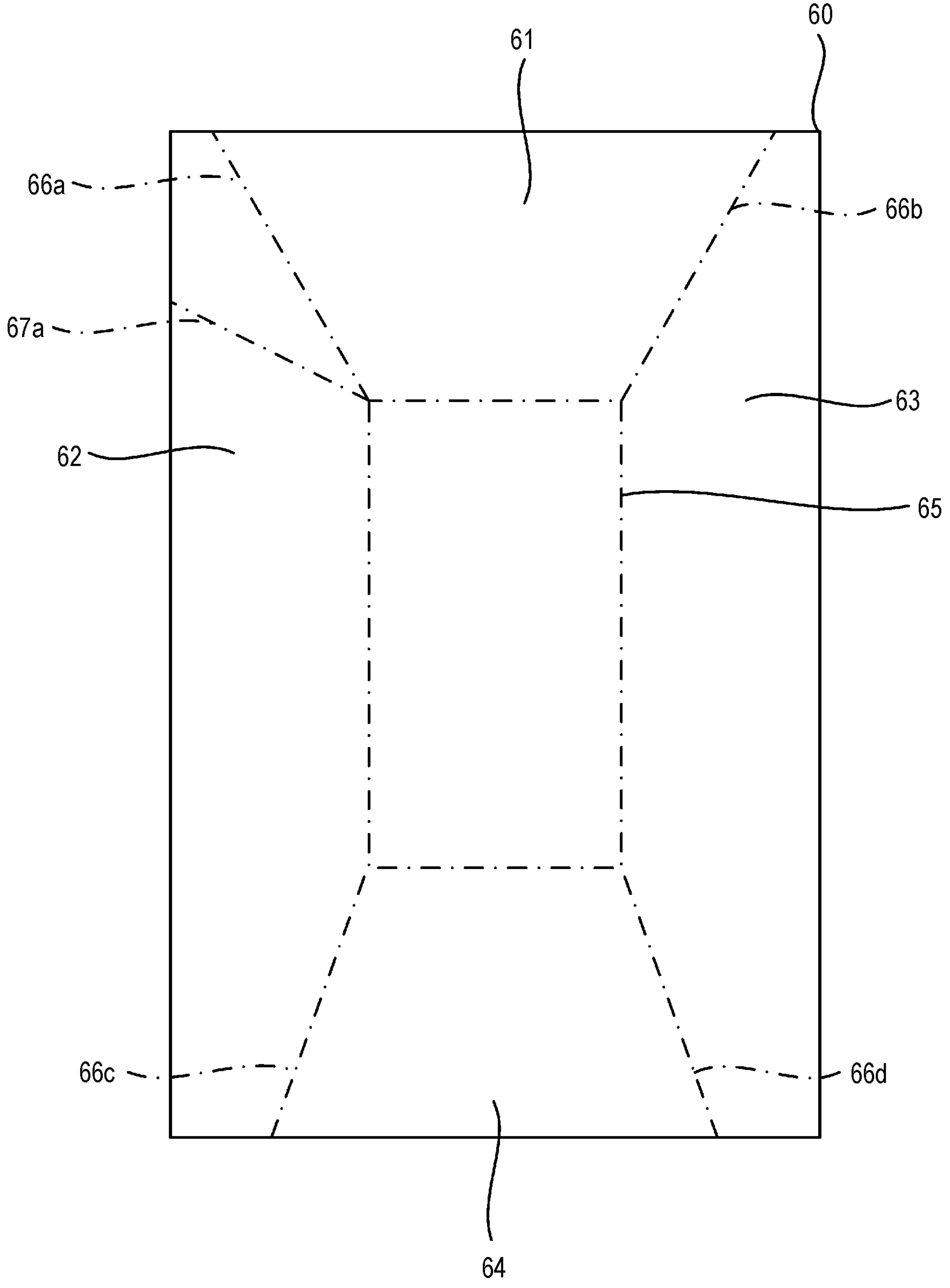
FIG. 4 is a diagram illustrating an example of a synthesized image generated based on respective pieces of imaging data of a plurality of cameras.

Next, change of a boundary region in a synthesized image of pieces of imaging data will be described with reference to FIG. 4. FIG. 4 is a diagram illustrating an example of a synthesized image generated based on respective pieces of imaging data obtained by the front camera 12Fr, the rear camera 12Rr, the left lateral-side camera 12L, and the right lateral-side camera 12R.

As illustrated in FIG. 4, when generating a synthesized image 60, the image processor 57 performs viewpoint conversion, image distortion correction and the like on imaging data of imaging areas imaged by the front camera 12Fr, the rear camera 12Rr, the left lateral-side camera 12L, and the right lateral-side camera 12R so as to obtain images having the effect of viewing down from a predetermined viewpoint position vertically above the vehicle 10. Further, from converted images obtained by the conversion processing, the image processor 57 extracts a front image 61, a left lateral-side image 62, a right lateral-side image 63, and a rear image 64 having predetermined view angle ranges that are set for respective converted images so that adjacent images on both sides of a boundary region match with each other. Then, the image processor 57 synthesizes these images 61 to 64 to generate the synthesized image 60. A mask area 65 is provided in a central portion of the synthesized image 60 so as to surround the vehicle 10.

Boundary regions 66 (66*a* to 66*d*) representing boundaries of captured images are provided between adjacent captured images of the front image 61, the left lateral-side image 62, the right lateral-side image 63, and the rear image 64. For example, a left front boundary region 66*a* is provided between the captured images of the front image 61 and the left lateral-side image 62. A right front boundary region 66*b* is provided between the captured images of the front image 61 and the right lateral-side image 63. A left rear boundary region 66*c* is provided between the captured images of the left lateral-side image 62 and the rear image

64. A right rear boundary region 66*d* is provided between the captured images of the right lateral-side image 63 and the rear image 64.

As described above, the front image 61, the left lateral-side image 62, the right lateral-side image 63, and the rear image 64 constituting the synthesized image 60 are extracted as images having predetermined view angle ranges that are set for respective converted images so that adjacent captured images match with each other. Therefore, the predetermined view angle ranges set for the respective converted images may be view angle ranges at which adjacent captured images match with each other, and are not necessarily a unique view angle range. Therefore, it is possible to change positions of the boundary regions 66*a* to 66*d* between the adjacent captured images according to the view angle ranges extracted for the respective converted images.

View angle ranges of images that can be captured by the front camera 12Fr, the rear camera 12Rr, the left lateral-side camera 12L, and the right lateral-side camera 12R are set to a size such that adjacent captured images overlap each other by an area of a certain extent. Therefore, the boundary regions 66*a* to 66*d* between the adjacent captured images can be freely extracted from within the overlapping area, with matching of boundary region set as a condition for the extraction. For example, in the synthesized image 60 illustrated in FIG. 4, the boundary region 66*a* between the left lateral-side image 62 and the front image 61 may be shifted to a lateral side to be extracted as a boundary region 67*a*.

The front image 61, the left lateral-side image 62, the right lateral-side image 63, and the rear image 64 are extracted as images having predetermined view angle ranges that are set for respective converted images so that adjacent captured images match with each other. Since the images 61 to 64 are images obtained by performing conversion processing on imaging data captured by the different cameras, a certain degree of distortion is often generated in the images at the boundary regions 66*a* to 66*d* of the synthesized image, causing a lowered visibility. Therefore, in a case where it is predicted that the boundary regions 66*a* to 66*d* are present in the specific region, which is easily visible (conspicuous) to the user, when the rotation of the space in the three-dimensional image is stopped, the image processor 57 changes the boundary regions 66*a* to 66*d* so that the boundary regions 66*a* to 66*d* at the time of the stop are not present in the specific region.

<Display Control Performed by Control ECU 20>

Next, display control for a three-dimensional image performed by the control ECU 20 will be described.

[First Example of Display Control]

Figure 5:
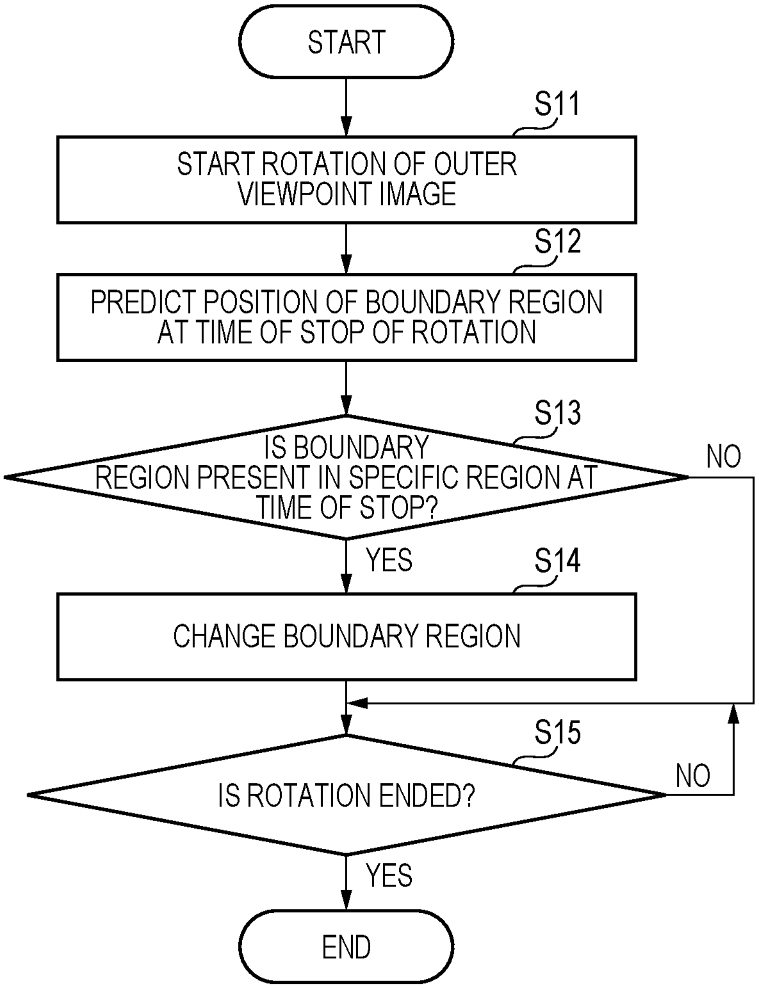
FIG. 5 is a flowchart illustrating a first example of display control performed by a control ECU.

A first example of display control for a three-dimensional image performed by the control ECU 20 will be described with reference to FIGS. 5 to 7. FIG. 5 is a flowchart illustrating the first example of display control for a three-dimensional image performed by the control ECU 20. FIG. 6 is a diagram illustrating an example of an outer viewpoint three-dimensional image in which a boundary region is present in the specific region. FIG. 7 is a diagram illustrating an example of an outer viewpoint three-dimensional image in which boundary regions are changed so that the boundary region illustrated in FIG. 6 is not present in the specific region.

When a rotation operation button (for example, an automatic rotation button 74, a manual right rotation button 75*a*, and a manual left rotation button 75*b* illustrated in FIG. 6) for rotating the space in the three-dimensional image is turned on by the occupant of the vehicle 10, the control ECU 20 starts the processing illustrated in FIG. 5. In the present example of display control, a case where the automatic rotation button 74 for automatically rotating the space in the three-dimensional image is turned on will be described below.

First, the control ECU 20 causes the image processor 57 to start automatic rotation of an outer viewpoint three-dimensional image (for example, the three-dimensional image as illustrated in FIGS. 6 and 7) indicating a space in a three-dimensional image viewed from an outer side of the vehicle 10 (step S11). It is assumed that the automatic rotation in the present example of display control is configured such that the space in the three-dimensional image is rotated clockwise for 5 seconds when the automatic rotation button 74 is pressed.

Next, the control ECU 20 causes the prediction unit 56 to predict a position of a boundary region in the outer viewpoint three-dimensional image at the time when the automatic rotation of the outer viewpoint three-dimensional image started in step S11 is stopped (step S12). Since the automatic rotation goes clockwise for 5 seconds as described above, the position the boundary region is at when 5 seconds elapse since the pressing of the automatic rotation button 74 is predicted.

Next, the control ECU 20 determines whether the position of the boundary region at the time of stop predicted in step S12 is present in the specific region (step S13). For example, as illustrated in FIGS. 6 and 7, the specific region is a region corresponding to a near side (front side) of the vehicle 10 in the outer viewpoint three-dimensional images 70A and 70B, and is a specific region 73 partitioned into a rectangular shape in a substantially central portion.

The three-dimensional image is actually a two-dimensional image that two-dimensionally indicates a three-dimensional space. The specific region 73 is, for example, a two-dimensional region located at a center in a left-right direction and located slightly below a center in an up-down direction in the two-dimensional image. In this case, the control ECU 20 performs the determination in step S13 by two-dimensional coordinate calculation. Alternatively, the specific region 73 may be a three-dimensional region located on a near side in the three-dimensional space indicated by the three-dimensional image. In this case, the control ECU 20 performs the determination in step S13 by three-dimensional coordinate calculation.

When the position of the boundary region at the time of stop is present in the specific region 73 in step S13 (step S13: Yes), the control ECU 20 causes the image processor 57 to change the boundary region present in the specific region 73 so that the boundary region at the time of stop is not present in the specific region 73 (step S14).

For example, it is assumed that, when the automatic rotation of the outer viewpoint three-dimensional image stops, the outer viewpoint three-dimensional image stops like the outer viewpoint three-dimensional image 70A illustrated in FIG. 6. As illustrated in FIG. 6, the outer viewpoint three-dimensional image 70A includes a three-dimensional surroundings image 71 obtained by performing image processing on a synthesized image of the surroundings of the vehicle 10 so as to appear three-dimensional, and a three-dimensional vehicle image 72 showing the vehicle 10 displayed in a superimposed manner in a mask area set in the synthesized image of the surroundings. In this case, the prediction unit 56 predicts that the left front boundary region 66*a* between the captured images of the front image 61 and the left lateral-side image 62 included in the three-dimensional surroundings image 71 is present in the specific region 73.

Therefore, the control ECU 20 causes the image processor 57 to change the boundary region between the front image 61 and the left lateral-side image 62 to the left front boundary region 67a so that the left front boundary region 67a at the time of stop is not present in the specific region 73, for example, as in the outer viewpoint three-dimensional image 70B illustrated in FIG. 7.

Next, the control ECU 20 causes the image processor 57 to determine whether the automatic rotation started in step S11 is ended (step S15).

When the automatic rotation is not ended in step S15 (step S15: No), the control ECU 20 causes the image processor 57 to repeat the processing of step S15 until the automatic rotation ends.

When the automatic rotation is ended in step S15 (step S15: Yes), the control ECU 20 causes the display controller 55 to stop and display, on the touch screen 42, the outer viewpoint three-dimensional image (for example, the outer viewpoint three-dimensional image 70B illustrated in FIG. 7) in which the boundary regions 66a to 66d are not present in the specific region 73, and ends the display control.

When the position of the boundary region at the time of stop is not present in the specific region in step S13 (step S13: No), the control ECU 20 proceeds to step S15, determines whether the automatic rotation is ended, and ends the display control.

In the present example of display control, the control ECU 20 causes the touch screen 42 to stop and display, at the end of the automatic rotation, the outer viewpoint three-dimensional image that is changed so that the boundary regions 66a to 66d are not present in the specific region 73 (step S15), but the present disclosure is not limited thereto. For example, the control ECU 20 may cause the touch screen 42 to display, before end of the automatic rotation, that is, during the automatic rotation, the outer viewpoint three-dimensional image that is changed so that the boundary regions 66a to 66d are not present in the specific region 73.

As described above, in the first example of display control of the control ECU 20, when it is predicted that the boundary region 66a between pieces of imaging data in the outer viewpoint three-dimensional image 70A is present in the specific region 73 at the time of stop of the automatic rotation, the image processor 57 changes the boundary region to the boundary region 67a, for example, as illustrated in the outer viewpoint three-dimensional image 70B of FIG. 7. Accordingly, it is possible to prevent the boundary region 67a of the outer viewpoint three-dimensional image from being present in a conspicuous region when the automatic rotation stops. Therefore, it is possible to improve the visibility of the outer viewpoint three-dimensional image displayed on the touch screen 42, and it is possible to reduce a sense of discomfort for the user who views the outer viewpoint three-dimensional image.

In the first example of display control of the control ECU 20, the specific region 73 is a region corresponding to the near side of the three-dimensional vehicle image 72 (vehicle 10) in the outer viewpoint three-dimensional image. In the case of the outer viewpoint three-dimensional image, it is preferable that the boundary region is not present in the region corresponding to the near side of the three-dimensional vehicle image 72 (vehicle 10).

[Second Example of Display Control]

Figure 8:
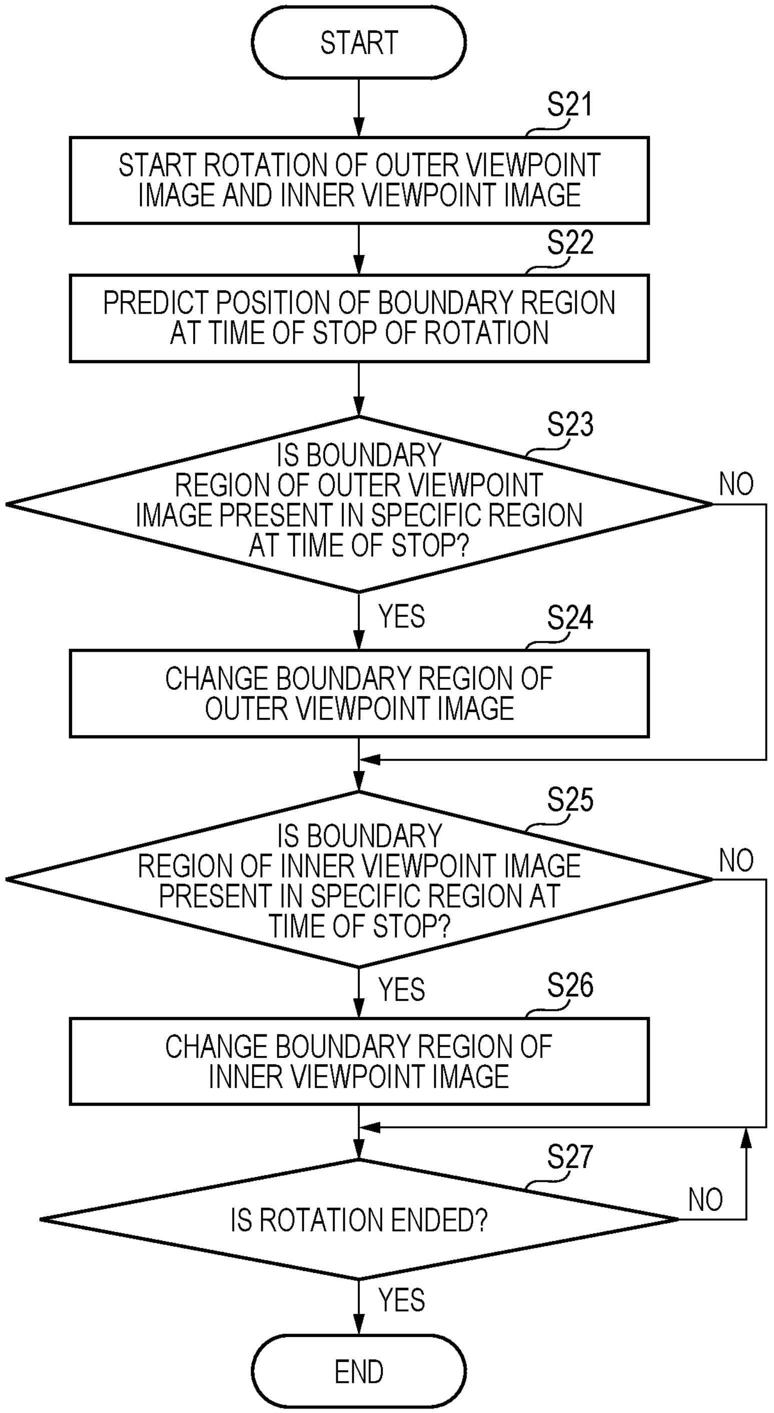
FIG. 8 is a flowchart illustrating a second example of display control performed by the control ECU.

A second example of display control for a three-dimensional image performed by the control ECU 20 will be described with reference to FIGS. 8 to 10. FIG. 8 is a flowchart illustrating the second example of display control for a three-dimensional image performed by the control ECU 20. FIG. 9 is a diagram illustrating an example of an inner viewpoint three-dimensional image in which a boundary region is present in the specific region. FIG. 10 is a diagram illustrating an example of an inner viewpoint three-dimensional image in which boundary regions are changed so that the boundary region illustrated in FIG. 9 is not present in the specific region.

Similarly to the first example of display control described above, when the automatic rotation button 74 for automatically rotating a space in the three-dimensional image is turned on, the control ECU 20 starts the processing shown in FIG. 8.

First, the control ECU 20 causes the image processor 57 to start automatic rotation of an outer viewpoint three-dimensional image (for example, the three-dimensional image as illustrated in FIGS. 6 and 7) indicating a space viewed from an outer side of the vehicle 10, and an inner viewpoint three-dimensional image (for example, the three-dimensional image as illustrated in FIGS. 9 and 10) indicating a space viewed from an inner side of the vehicle 10 (step S21). It is assumed that, in the present example of display control, the space in the three-dimensional image is rotated clockwise for 5 seconds when the automatic rotation button 74 is pressed.

Next, the control ECU 20 causes the prediction unit 56 to predict positions of the boundary regions in the outer viewpoint three-dimensional image and the inner viewpoint three-dimensional image at the time when the automatic rotation of the outer viewpoint three-dimensional image and the inner viewpoint three-dimensional image started in step S21 is stopped (step S22). Since the automatic rotation goes clockwise for 5 seconds, the position the boundary region is at when 5 seconds elapse since the pressing of the automatic rotation button 74 is predicted.

Next, the control ECU 20 determines whether the position of the boundary region at the time of stop in the outer viewpoint three-dimensional image predicted in step S22 is present in a specific region (step S23). Similarly to the first example of display control, the specific region is like the specific region 73 in FIGS. 6 and 7.

When the position of the boundary region at the time of stop of the outer viewpoint three-dimensional image is present in the specific region 73 in step S23 (step S23: Yes), the control ECU 20 causes the image processor 57 to change the boundary region present in the specific region 73 so that the boundary region at the time of stop is not present in the specific region 73 (step S24).

Specifically, similarly to the first example of display control, the left front boundary region 66a between the front image 61 and the left lateral-side image 62 present in the specific region 73 as in the outer viewpoint three-dimensional image 70A illustrated in FIG. 6 is changed so as not to be present in the specific region 73 like the left front boundary region 67a of the outer viewpoint three-dimensional image 70B illustrated in FIG. 7.

Next, the control ECU 20 determines whether the position of the boundary region at the time of stop in the inner viewpoint three-dimensional image predicted in step S22 is present in the specific region (step S25). For example, as illustrated in FIGS. 9 and 10, the specific region is a region mainly corresponding to a back side of the vehicle 10 in inner viewpoint three-dimensional images 80A and 80B, and is a specific region 83 partitioned into a rectangular shape in a substantially central portion.

As described above, the three-dimensional image is actually a two-dimensional image that two-dimensionally indicates a three-dimensional space. The specific region 83 is, for example, a two-dimensional region located at a center in a left-right direction and located at a center in an up-down direction in the two-dimensional image. In this case, the control ECU 20 performs the determination in step S25 by two-dimensional coordinate calculation. Alternatively, the specific region 83 may be a three-dimensional region located on a back side in the three-dimensional space indicated by the three-dimensional image. In this case, the control ECU 20 performs the determination in step S25 by three-dimensional coordinate calculation.

When the position of the boundary region at the time of stop of the outer viewpoint three-dimensional image is not present in the specific region in step S23 (step S23: No), the control ECU 20 proceeds to step S25 as it is, and determines whether the position of the boundary region at the time of stop of the inner viewpoint three-dimensional image is present in the specific region.

When the position of the boundary region at the time of stop of the inner viewpoint three-dimensional image is present in the specific region 83 in step S25 (step S25: Yes), the control ECU 20 causes the image processor 57 to change the boundary region present in the specific region 83 so that the boundary region at the time of stop is not present in the specific region (step S26).

For example, it is assumed that, when the automatic rotation of the inner viewpoint three-dimensional image stops, the inner viewpoint three-dimensional image stops like the inner viewpoint three-dimensional image 80A illustrated in FIG. 9. As illustrated in FIG. 9, the inner viewpoint three-dimensional image 80A includes a three-dimensional surroundings image 81 obtained by performing image processing on a synthesized image of the surroundings of the vehicle 10 so as to appear three-dimensional, and a three-dimensional vehicle image 82 showing the vehicle 10 displayed in a superimposed manner in a mask area set in the synthesized image of the surroundings. In this case, the prediction unit 56 predicts that the right front boundary region 66*b* between the captured images of the front image 61 and the right lateral-side image 63 included in the three-dimensional surroundings image 81 is present in the specific region 83.

Therefore, the control ECU 20 causes the image processor 57 to change the position of the boundary region between the front image 61 and the right lateral-side image 63 so that the boundary region is not present in the specific region 83 like the left front boundary region 67*b*, for example, as in the inner viewpoint three-dimensional image 80B illustrated in FIG. 10.

Next, the control ECU 20 causes the image processor 57 to determine whether the automatic rotation of the outer viewpoint three-dimensional image and the automatic rotation of the inner viewpoint three-dimensional image in step S21 are ended (step S27).

When the automatic rotations are not ended in step S27 (step S27: No), the control ECU 20 causes the image processor 57 to repeat the processing of step S27 until the automatic rotations end.

When the automatic rotations are ended in step S27 (step S27: Yes), the control ECU 20 causes the display controller 55 to stop and display, on the touch screen 42, the outer viewpoint three-dimensional image (for example, the outer viewpoint three-dimensional image 70B illustrated in FIG. 7) in which the boundary regions 66*a* to 66*d* are not present in the specific region 73 or the inner viewpoint three-dimensional image (for example, the inner viewpoint three-dimensional image 80B illustrated in FIG. 10) in which the boundary regions 66*a* to 66*d* are not present in the specific region 83, and ends the display control. Whether the outer viewpoint three-dimensional image or the inner viewpoint three-dimensional image is displayed on the touch screen 42 may be selected when the automatic rotation button 74 is turned on, or may be switched during the automatic rotation. In addition, the outer viewpoint three-dimensional image and the inner viewpoint three-dimensional image may be displayed in parallel on the touch screen 42.

When the position of the boundary region at the time of stop of the inner viewpoint three-dimensional image is not present in the specific region in step S25 (step S25: No), the control ECU 20 proceeds to step S27, determines whether the automatic rotation of the outer viewpoint three-dimensional image and the automatic rotation of the inner viewpoint three-dimensional image in step S21 are ended, and ends the display control.

A timing, at which the outer viewpoint three-dimensional image or the inner viewpoint three-dimensional image changed so that the boundary regions 66*a* to 66*d* are not present in the specific regions 73 and 83 is displayed on the touch screen 42, may be before end of the automatic rotation, that is, during the automatic rotation, as in the first example of display control described above.

As described above, in the second example of display control of the control ECU 20, the image processor 57 enables rotation of each of the outer viewpoint three-dimensional image indicating the space of the three-dimensional image viewed from the outer side of the vehicle 10 and the inner viewpoint three-dimensional image indicating the space of the three-dimensional image viewed from the inner side of the vehicle 10, and changes the respective boundary regions when it is determined that the boundary regions 66*a* to 66*d* are present in the specific regions 73 and 83 at the time of stop of the rotation. Accordingly, for each of the outer viewpoint three-dimensional image and the inner viewpoint three-dimensional image of the vehicle 10, it is possible to prevent the boundary regions 66*a* to 66*d* from being present in a conspicuous region thereof when the rotation is stopped. Therefore, it is possible to improve the visibility of the outer viewpoint three-dimensional image and the inner viewpoint three-dimensional image displayed on the touch screen 42, and it is possible to reduce a sense of discomfort for the user. For example, a boundary region, which is hidden behind the vehicle 10 and is not conspicuous when the outer viewpoint three-dimensional image is displayed, may be present in a conspicuous region when the inner viewpoint three-dimensional image is displayed. Therefore, in such a case, it is possible to improve the visibility of the inner viewpoint three-dimensional image by individually changing the boundary region of the inner viewpoint three-dimensional image, and it is possible to reduce a sense of discomfort for the user.

Although the embodiment of the present disclosure has been described above, the present disclosure is not limited to the above embodiment, and modifications, improvements, and the like can be made as appropriate.

For example, although a case where the automatic rotation of the space in the three-dimensional image is controlled to be displayed based on the operation of the automatic rotation button 74 has been described in the above-described embodiment, the present disclosure is not limited thereto. For example, the display control of the manual rotation may be performed based on the operation of the manual right rotation button 75*a* or the manual left rotation button 75*b* for manually rotating the space in the three-dimensional image. Specifically, the positions of the boundary regions 66*a* to 66*d* at the time when the space in the three-dimensional image is stopped may be predicted by the prediction unit 56 based on a rotation amount of the manual rotation corresponding to time during which the manual right rotation button 75*a* or the manual left rotation button 75*b* is pressed. When it is predicted that the boundary regions 66*a* to 66*d* at the time of stop are present in the specific regions 73 and 83, the boundary regions present in the specific regions 73 and 83 may be changed so that the boundary regions 66*a* to 66*d* at the time of stop are not present in the specific regions 73 and 83. Even when the display control is performed in this way, the same effects as those of the first and second examples of display control in the above-described embodiment can be obtained.

Although a case where the control ECU 20 displays a three-dimensional image on the touch screen 42 of the vehicle 10 has been described in the above-described embodiment, the present disclosure is not limited thereto. For example, the control ECU 20 may display the three-dimensional image on a display screen of an information terminal (for example, a smartphone) possessed by the occupant of the vehicle 10 via the communication unit 24.

Although a case where rotation buttons displayed on the touch screen 42 are touch-operated in order to automatically rotate or manually rotate the three-dimensional image has been described in the above-described embodiment, the present disclosure is not limited thereto. For example, the automatic rotation or the manual rotation may be performed by an operation of a mechanical button, an operation based on a voice instruction, or an operation based on a detected line of sight of the driver.

Although a case where imaging data is obtained by a plurality of imaging devices (the front camera 12Fr, the rear camera 12Rr, the left lateral-side camera 12L, and the right lateral-side camera 12R) has been described in the above-described embodiment, alternatively, for example, the imaging data may be obtained by a single 360-degree camera.

Although an example in which the moving body is a vehicle is described in the above-described embodiment, the present disclosure is not limited thereto. The concept of the present disclosure can be applied not only to a vehicle but also to a robot, a boat, an aircraft, and the like that are provided with a driving source and movable by power of the driving source.

The control method described in the above embodiment can be implemented by executing a control program prepared in advance on a computer. The control program is recorded in a computer-readable storage medium and is executed by being read from the storage medium. The control program may be provided in a form stored in a non-transitory storage medium such as a flash memory, or may be provided via a network such as the Internet. The computer that executes the control program may be provided in a control device, may be provided in an electronic device such as a smartphone, a tablet terminal, or a personal computer capable of communicating with the control device, or may be provided in a server device capable of communicating with the control device and the electronic device.

At least the following matters are described in the present specification. Although the corresponding constituent elements or the like in the above embodiment are shown in parentheses, the present disclosure is not limited thereto.

(1) A control device, including:

an image processor (image processor 57) that generates, based on respective pieces of imaging data obtained by a plurality of imaging devices (front camera 12Fr, rear camera 12Rr, left lateral-side camera 12L, and right lateral-side camera 12R) of a moving body (vehicle 10), a three-dimensional image indicating a space including both the moving body and surroundings of the moving body, and enables rotation of the space in the three-dimensional image; and a display controller (display controller 55) that causes a display device to display the three-dimensional image generated by the image processor, in which when it is predicted that a boundary region (boundary regions 66*a* to 66*d*) of the respective pieces of imaging data in the three-dimensional image is present in a specific region (specific region 73) at time of stop of the rotation, the image processor changes the boundary region.

According to (1), it is possible to prevent the boundary region of the three-dimensional image from being present in a conspicuous region when the rotation is stopped, and it is possible to reduce a sense of discomfort for a user.

(2) The control device according to (1), in which the specific region is a region corresponding to a near side of the moving body in the space.

According to (2), it is preferable that the boundary region of the three-dimensional image is not present in the region corresponding to the near side of the moving body.

(3) The control device according to (1) or (2), in which the three-dimensional image includes a first image (outer viewpoint three-dimensional images 70A and 70B) indicating the space viewed from an outer side of the moving body and a second image (inner viewpoint three-dimensional images 80A and 80B) indicating the space viewed from an inner side of the moving body, and in which the image processor enables the rotation of each of the first image and the second image, and changes the boundary region when it is predicted that the boundary region is present in a specific region (specific regions 73 and 83) at time of stop of the rotation.

According to (3), for each of the first image indicating the space viewed from the outer side of the moving body and the second image indicating the space viewed from the inner side of the moving body, it is possible to prevent the boundary region from being present in a conspicuous region at the time of stop of the rotation, and it is possible to reduce a sense of discomfort for the user. For example, a boundary region, which is hidden behind the moving body and is not conspicuous in the first image, may be conspicuous in the second image, and in such a case, the boundary region of the second image is individually changed.

(4) A control method to be executed by a control device, the control device being configured to generate, based on respective pieces of imaging data obtained by a plurality of imaging devices of a moving body, a three-dimensional image indicating a space including both the moving body and surroundings of the moving body, enable rotation of the space in the three-dimensional image, and display the three-dimensional image on a display device, the control method including:

when it is predicted that a boundary region of the respective pieces of imaging data in the three-dimensional image is present in a specific region at time of stop of the rotation, a processor of the control device changing the boundary region.

According to (4), it is possible to prevent the boundary region of the three-dimensional image from being present in a conspicuous region when the rotation is stopped, and it is possible to reduce a sense of discomfort for a user.

(5) A control program for causing a processor of a control device to perform processing, the control device being configured to generate, based on respective pieces of imaging data obtained by a plurality of imaging devices of a moving body, a three-dimensional image indicating a space including both the moving body and surroundings of the moving body, enable rotation of the space in the three-dimensional image, and display the three-dimensional image on a display device, the processing including:

when it is predicted that a boundary region of the respective pieces of imaging data in the three-dimensional image is present in a specific region at time of stop of the rotation, changing the boundary region.

According to (5), it is possible to prevent the boundary region of the three-dimensional image from being present in a conspicuous region when the rotation is stopped, and it is possible to reduce a sense of discomfort for a user.

The invention claimed is:

1. A control device, comprising circuitry configured to:

generate, based on respective pieces of imaging data obtained by a plurality of imaging devices of a moving body, a three-dimensional image indicating a space including both the moving body and surroundings of the moving body; and cause a display device to display generated the three-dimensional image, wherein the circuitry is capable of rotation of the space in the three-dimensional image, and wherein when it is predicted that a boundary region of the respective pieces of imaging data in the three-dimensional image is present in a specific region at time of stop of the rotation, the circuitry changes the boundary region.

2. The control device according to claim 1, wherein the specific region is a region corresponding to a near side of the moving body in the space.

3. The control device according to claim 1, wherein the three-dimensional image includes a first image indicating the space viewed from an outer side of the moving body and a second image indicating the space viewed from an inner side of the moving body, and wherein the circuitry is capable of the rotation of each of the first image and the second image, and changes the boundary region when it is predicted that the boundary region is present in a specific region at time of stop of the rotation.

4. A control method to be executed by a control device, the control method comprising:

generating, based on respective pieces of imaging data obtained by a plurality of imaging devices of a moving body, a three-dimensional image indicating a space including both the moving body and surroundings of the moving body; and displaying the three-dimensional image on a display device, wherein the control device is capable of rotation of the space in the three-dimensional image, and wherein the control method further comprises when it is predicted that a boundary region of the respective pieces of imaging data in the three-dimensional image is present in a specific region at time of stop of the rotation, changing the boundary region.

5. A non-transitory computer-readable recording medium storing a control program for causing a processor of a control device to perform processing, the processing comprising:

generating, based on respective pieces of imaging data obtained by a plurality of imaging devices of a moving body, a three-dimensional image indicating a space including both the moving body and surroundings of the moving body;

displaying the three-dimensional image on a display device, wherein the processor is capable of rotation of the space in the three-dimensional image, and wherein the processing further comprises when it is predicted that a boundary region of the respective pieces of imaging data in the three-dimensional image is present in a specific region at time of stop of the rotation, changing the boundary region.

* * * * *